US012683656B2

(12) United States Patent
Regev et al.

(10) Patent No.: US 12,683,656 B2
(45) Date of Patent: Jul. 14, 2026

(54) ADAPTIVE CONFIGURATION OF AN ANTENNA

(71) Applicant: QUALCOMM Incorporated, San Diego, CA (US)

(72) Inventors: Aviv Regev, Tel Aviv (IL); Ronen Shaked, Kfar Saba (IL); Daniel Paz, Atlit (IL)

(73) Assignee: QUALCOMM Incorporated, San Diego, CA (US)

( * ) Notice: Subject to any disclaimer, the term of this patent is extended or adjusted under 35 U.S.C. 154(b) by 342 days.

(21) Appl. No.: 18/452,320

(22) Filed: Aug. 18, 2023

(65) Prior Publication Data

US 2025/0062805 A1     Feb. 20, 2025

(51) Int. Cl.
| | |
|---|---|
| *H04W 4/00* | (2018.01) |
| *H04B 7/06* | (2006.01) |
| *H04W 76/10* | (2018.01) |
| *H01Q 3/26* | (2006.01) |

(52) U.S. Cl.
CPC .......... *H04B 7/0617* (2013.01); *H04W 76/10* (2018.02); *H01Q 3/2605* (2013.01)

(58) Field of Classification Search
None
See application file for complete search history.

(56) References Cited

U.S. PATENT DOCUMENTS

| | | | |
|---|---|---|---|
| 2016/0087349 A1* | 3/2016 | Lee | H01Q 21/061 |
| | | | 342/373 |
| 2016/0157165 A1* | 6/2016 | Xie | H04W 48/16 |
| | | | 455/434 |
| 2018/0006379 A1* | 1/2018 | Cariou | H04W 16/28 |
| 2019/0166516 A1* | 5/2019 | Kim | H04W 24/10 |
| 2020/0245174 A1* | 7/2020 | Lu | H04B 7/18506 |
| 2020/0245175 A1* | 7/2020 | Zhang | H04W 76/27 |
| 2021/0021494 A1* | 1/2021 | Yao | H04L 41/0631 |
| 2021/0167512 A1* | 6/2021 | Lee | H01Q 3/44 |
| 2022/0046429 A1* | 2/2022 | Tung | H04W 16/28 |
| 2024/0019518 A1* | 1/2024 | Phuyal | G01S 1/18 |
| 2024/0276529 A1* | 8/2024 | Liu | H04W 72/51 |
| 2024/0298237 A1* | 9/2024 | Li | H04W 56/0045 |
| 2025/0007152 A1* | 1/2025 | Höykinpuro | H04W 64/003 |
| 2025/0008607 A1* | 1/2025 | Phuyal | H04L 65/611 |

* cited by examiner

*Primary Examiner* — Bob A Phunkulh
(74) *Attorney, Agent, or Firm* — Procopio, Cory, Hargreaves & Savitch

(57)     ABSTRACT

Apparatus, methods, and computer program products for wireless communication are provided. An example method may include establishing a connection with a network node based on a first antenna tilt angle and a first beam width. The example method may further include transmitting, to the network node, an uplink transmission to report an altitude associated with the UE and a metric associated with the connection. The example method may further include receiving, from the network node, a downlink transmission based on a second antenna tilt angle and a second beam width, where the second antenna tilt angle and the second beam width based on the altitude and the metric.

30 Claims, 9 Drawing Sheets

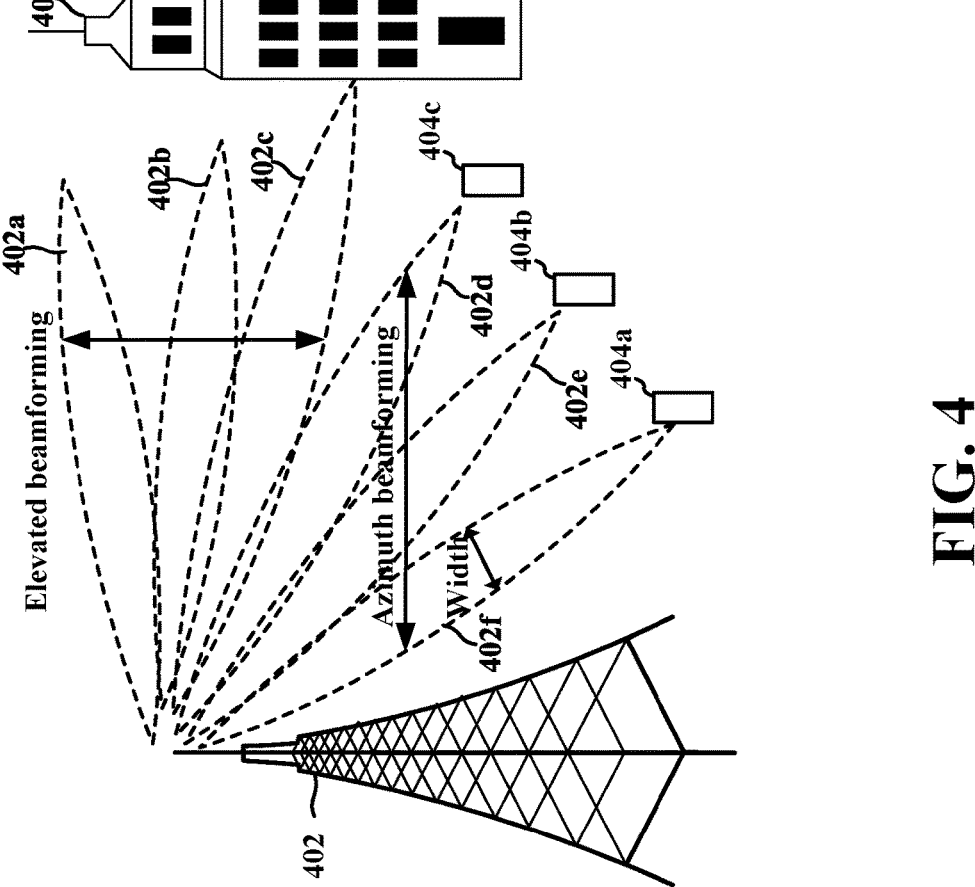
FIG. 4

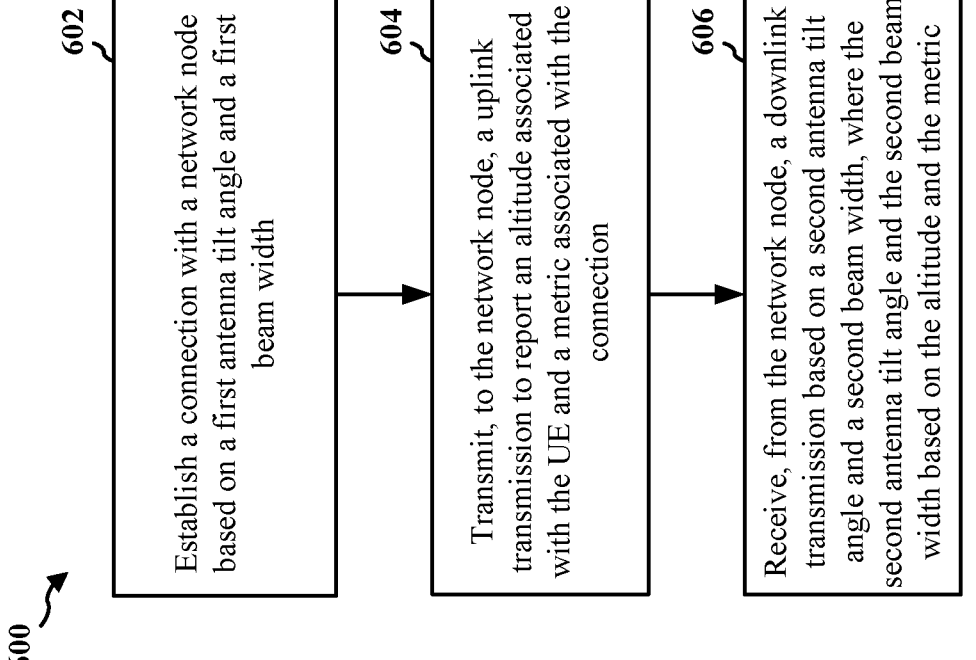

Establish a connection with a network node based on a first antenna tilt angle and a first beam width

604

Transmit, to the network node, a uplink transmission to report an altitude associated with the UE and a metric associated with the connection

606

Receive, from the network node, a downlink transmission based on a second antenna tilt angle and a second beam width, where the second antenna tilt angle and the second beam width based on the altitude and the metric

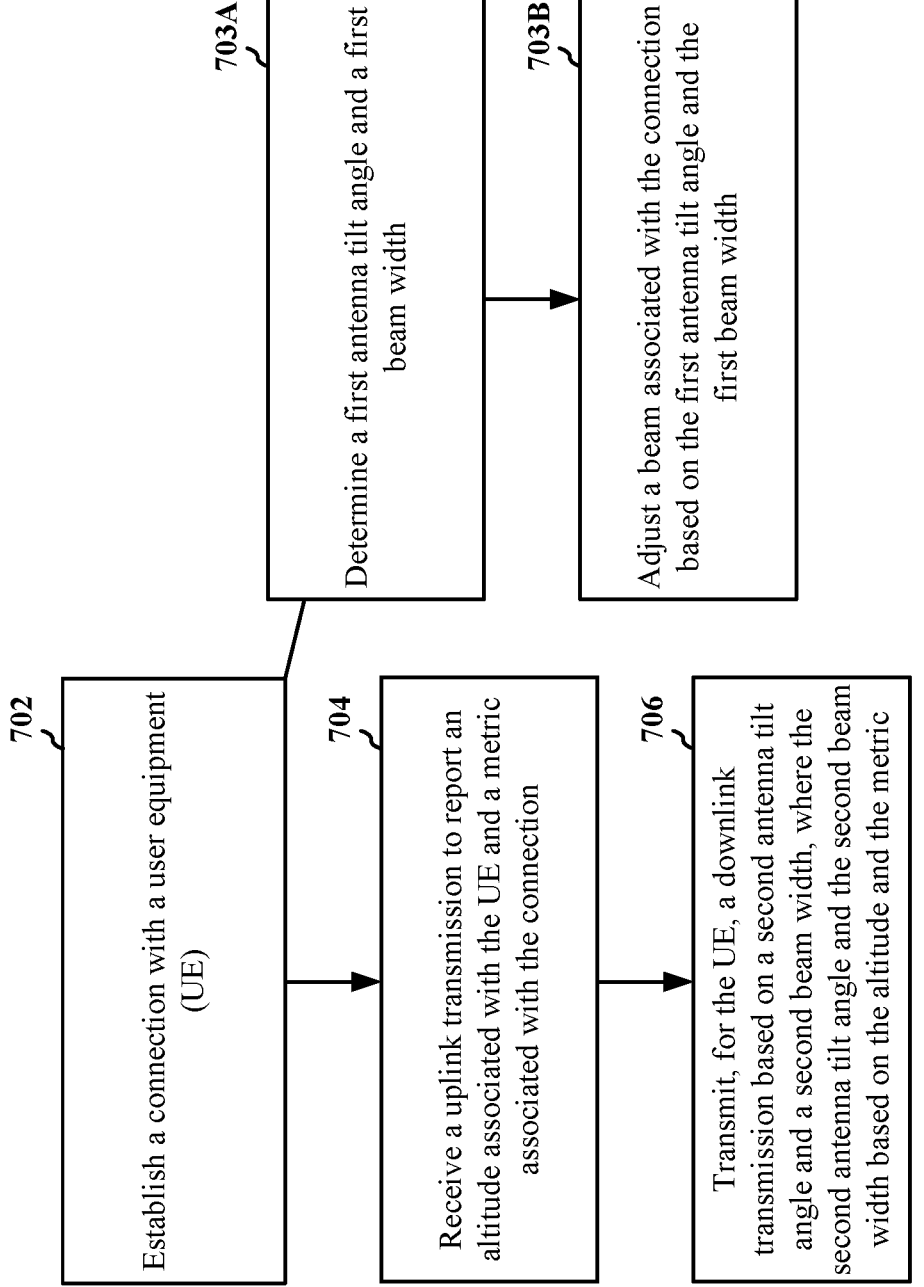

703A

Determine a first antenna tilt angle and a first beam width

703B

Adjust a beam associated with the connection based on the first antenna tilt angle and the first beam width

702

Establish a connection with a user equipment (UE)

704

Receive a uplink transmission to report an altitude associated with the UE and a metric associated with the connection

706

Transmit, for the UE, a downlink transmission based on a second antenna tilt angle and a second beam width, where the second antenna tilt angle and the second beam width based on the altitude and the metric

CU Processor
912

Component
199

Memory   912'

Memory
914

Communications
Interface
918

930

DU Processor
932

Component
199

Memory   932'

Memory
934

Communications
Interface
938

902

940

Memory
944

RU Processor
942

Component
199

Memory   942'

Transceiver(s)
946

Antennas
980

Communications
Interface
948

Midhaul
Link

Fronthaul
Link

ADAPTIVE CONFIGURATION OF AN ANTENNA

TECHNICAL FIELD

The present disclosure relates generally to communication systems, and more particularly, to wireless communication systems with an adjustable antenna at a network node.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus at a user equipment (UE) are provided. The apparatus may include at least one memory and at least one processor coupled to the at least one memory. Based at least in part on information stored in the at least one memory, the at least one processor, individually or in any combination, is configured to establish a connection with a network node based on a first antenna tilt angle and a first beam width. Based at least in part on information stored in the at least one memory, the at least one processor, individually or in any combination, is configured to transmit, to the network node, a uplink transmission to report an altitude associated with the UE and a metric associated with the connection. Based at least in part on information stored in the at least one memory, the at least one processor, individually or in any combination, is configured to receive, from the network node, a downlink transmission based on a second antenna tilt angle and a second beam width, where the second antenna tilt angle and the second beam width based on the altitude and the metric.

In another aspect of the disclosure, a method, a computer-readable medium, and an apparatus at a network entity are provided. The apparatus may include at least one memory and at least one processor coupled to the at least one memory. Based at least in part on information stored in the at least one memory, the at least one processor, individually or in any combination, is configured to establish a connection with a user equipment (UE). Based at least in part on information stored in the at least one memory, the at least one processor, individually or in any combination, is configured to determine a first antenna tilt angle and a first beam width. Based at least in part on information stored in the at least one memory, the at least one processor, individually or in any combination, is configured to adjust a beam associated with the connection based on the first antenna tilt angle and the first beam width. Based at least in part on information stored in the at least one memory, the at least one processor, individually or in any combination, is configured to receive a uplink transmission to report an altitude associated with the UE and a metric associated with the connection. Based at least in part on information stored in the at least one memory, the at least one processor, individually or in any combination, is configured to transmit, for the UE, a downlink transmission based on a second antenna tilt angle and a second beam width, where the second antenna tilt angle and the second beam width based on the altitude and the metric.

To the accomplishment of the foregoing and related ends, the one or more aspects include the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 4 is a diagram illustrating example beamforming, in accordance with various aspects of the present disclosure.

FIG. 6 is a flowchart of a method of wireless communication, in accordance with various aspects of the present disclosure.

FIG. 7 is a flowchart of a method of wireless communication, in accordance with various aspects of the present disclosure.

DETAILED DESCRIPTION

Figure 1:
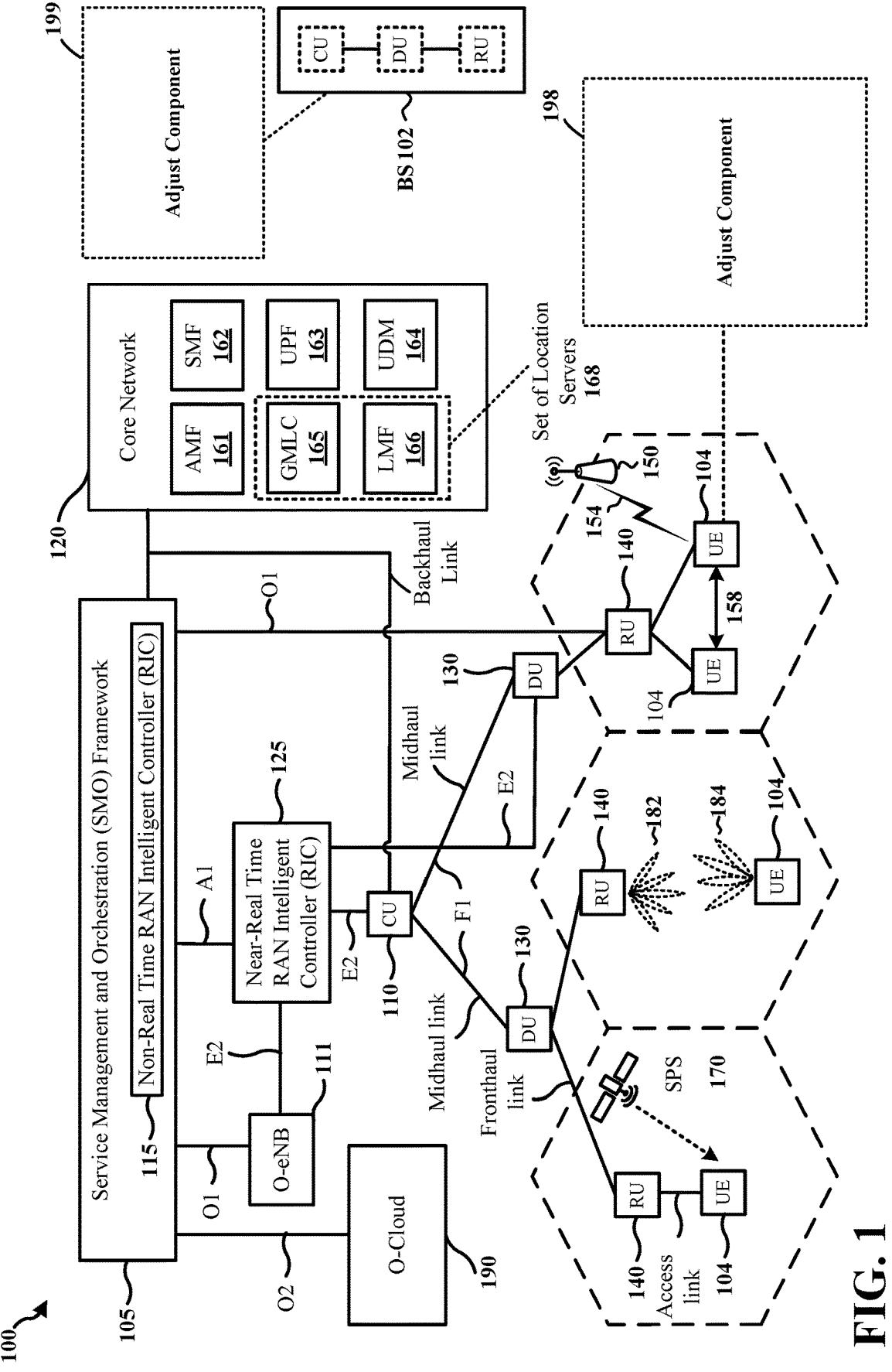
FIG. 1 is a diagram illustrating an example of a wireless communications system and an access network.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Aspects provided herein may facilitate a UE to signal its altitude (e.g., elevation) to the network node and the network node may accordingly use the altitude information as an a-priory information regarding beamforming, beam selection, antenna tilt angle, beam selection time, or scan specification, or the like. By using the altitude information, the network node may be able to apply a more suitable beam for the UE, which leads to more effective wireless communication.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. When multiple processors are implemented, the multiple processors may perform the functions individually or in combination. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units.

Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via 01) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth™ (Bluetooth is a trademark of the Bluetooth Special Interest Group (SIG)), Wi-Fi™ (Wi-Fi is a trademark of the Wi-Fi Alliance) based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in some aspects, the UE 104 may include a adjust component 198. In some aspects, the adjust component 198 may be configured to establish a connection with a network node based on a first antenna tilt angle and a first beam width. In some aspects, the adjust component 198 may be further configured to transmit, to the network node, a uplink transmission to report an altitude associated with the UE and a metric associated with the connection. In some aspects, the adjust component 198 may be further configured to receive, from the network node, a downlink transmission based on a second antenna tilt angle and a second beam width, where the second antenna tilt angle and the second beam width based on the altitude and the metric.

In certain aspects, the base station 102 may include a adjust component 199. In some aspects, the adjust component 199 may be configured to establish a connection with a user equipment (UE). In some aspects, the adjust component 199 may be further configured to determine a first antenna tilt angle and a first beam width. In some aspects, the adjust component 199 may be further configured to adjust a beam associated with the connection based on the first antenna tilt angle and the first beam width. In some aspects, the adjust component 199 may be further configured to receive a uplink transmission to report an altitude associated with the UE and a metric associated with the connection. In some aspects, the adjust component 199 may be further configured to transmit, for the UE, a downlink transmission based on a second antenna tilt angle and a second beam width, where the second antenna tilt angle and the second beam width based on the altitude and the metric.

Although the following description may be focused on 5G NR, the concepts described herein may be applicable to other similar areas, such as LTE, LTE-A, CDMA, GSM, and other wireless technologies.

As described herein, a node (which may be referred to as a node, a network node, a network entity, or a wireless node) may include, be, or be included in (e.g., be a component of) a base station (e.g., any base station described herein), a UE (e.g., any UE described herein), a network controller, an apparatus, a device, a computing system, an integrated access and backhauling (IAB) node, a distributed unit (DU), a central unit (CU), a remote/radio unit (RU) (which may also be referred to as a remote radio unit (RRU)), and/or another processing entity configured to perform any of the techniques described herein. For example, a network node may be a UE. As another example, a network node may be a base station or network entity. As another example, a first network node may be configured to communicate with a second network node or a third network node. In one aspect of this example, the first network node may be a UE, the second network node may be a base station, and the third network node may be a UE. In another aspect of this example, the first network node may be a UE, the second network node may be a base station, and the third network node may be a base station. In yet other aspects of this example, the first, second, and third network nodes may be different relative to these examples. Similarly, reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE is configured to receive information from a base station also discloses that a first network node is configured to receive information from a second network node, the first network node may refer to a first UE, a first base station, a first apparatus, a first device, a first computing system, a first set of one or more one or more components, a first processing entity, or the like configured to receive the information; and the second network node may refer to a second UE, a second base station, a second apparatus, a second device, a second computing system, a second set of one or more components, a second processing entity, or the like.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, disclosure that the first network node is configured to transmit information to the second network node includes disclosure that the first network node is configured to provide, send, output, communicate, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, or transmitted by the first network node.

Figures 2A, 2B, 2C, 2D:
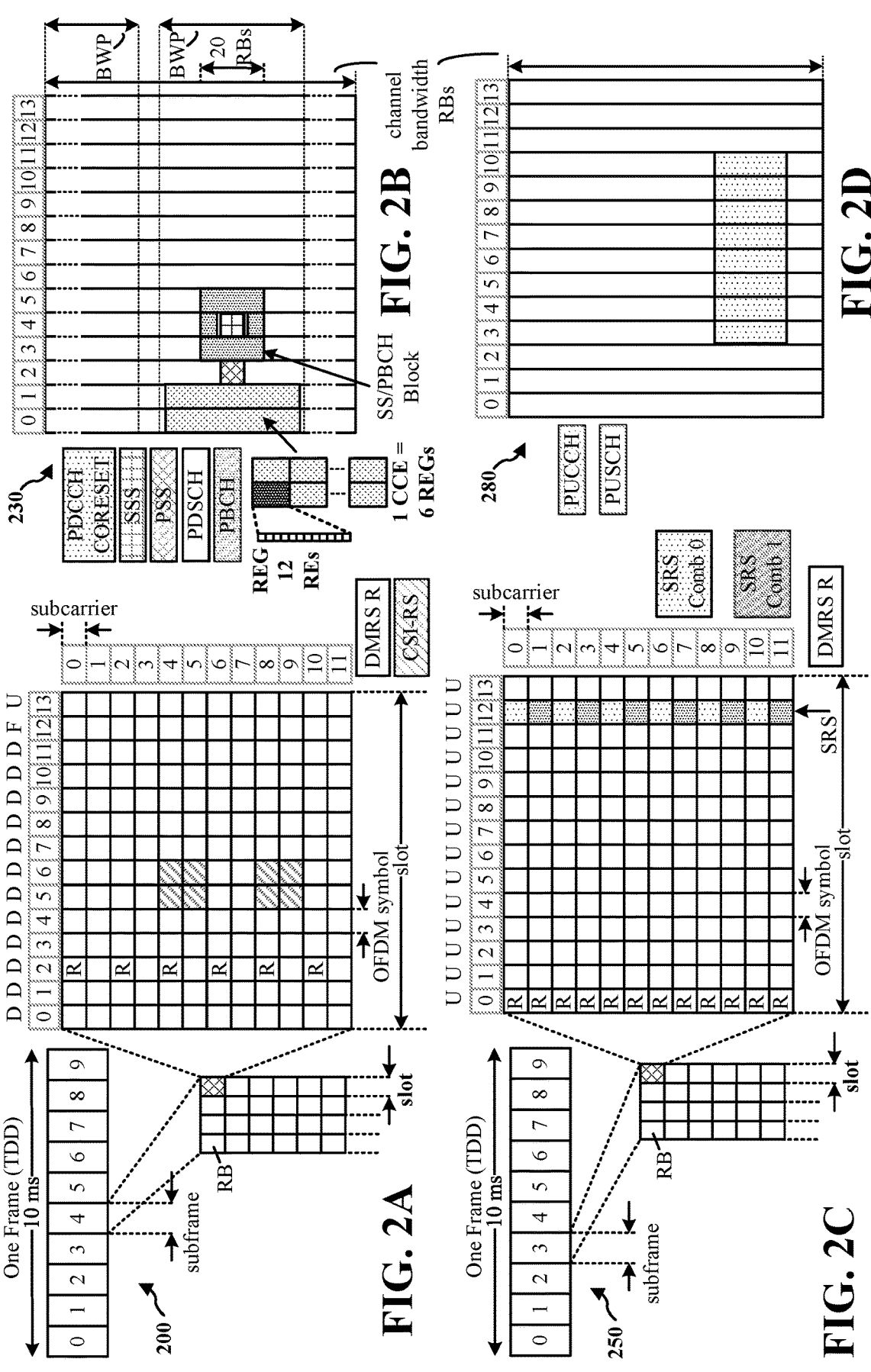
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

| Numerology, SCS, and CP | | |
| --- | --- | --- |
| μ | SCS $\Delta f = 2^{\mu} \cdot 15$ [kHz] | Cyclic prefix |
| 0 | 15 | Normal |
| 1 | 30 | Normal |
| 2 | 60 | Normal, Extended |
| 3 | 120 | Normal |
| 4 | 240 | Normal |

TABLE 1-continued

| | Numerology, SCS, and CP | |
| --- | --- | --- |
| μ | SCS<br>$\Delta f = 2^\mu \cdot 15$ [kHz] | Cyclic prefix |
| 5 | 480 | Normal |
| 6 | 960 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology p, there are 14 symbols/slot and 2 slots/subframe. The subcarrier spacing may be equal to 2*15 kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
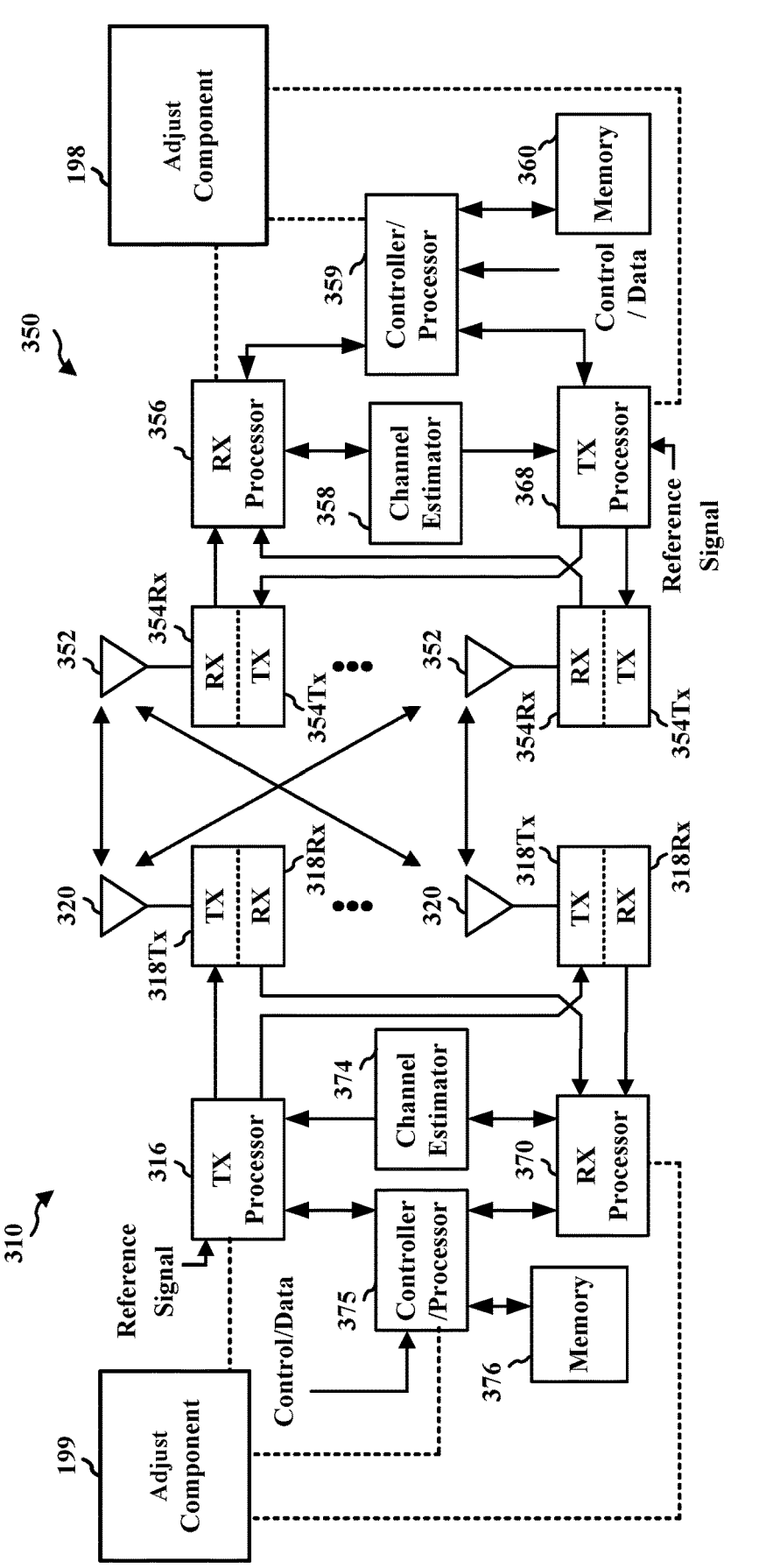
FIG. 3 is a diagram illustrating an example of a base station and user equipment (UE) in an access network, in accordance with various aspects of the present disclosure.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with at least one memory 360 that stores program codes and data. The at least one memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/ processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with at least one memory 376 that stores program codes and data. The at least one memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with adjust component 198 of FIG. 1.

At least one of the TX processor 316, the RX processor 370, and the controller/processor 375 may be configured to perform aspects in connection with adjust component 199 of FIG. 1.

FIG. 4 is a diagram 400 illustrating example beamforming, in accordance with various aspects of the present disclosure. As illustrated in FIG. 4, a network node 402 may be in communication with a UE 404*a*, a UE 404*b*, or a UE 404*c*. The network node 402 may transmit a beamformed signal to the UE 404*a*, the UE 404*b*, or the UE 404*c* in one or more of the directions 402*a*, 402*b*, 402*c*, 402*d*, 402*e*, 402*f*. The UE 404*a* may receive the beamformed signal from the network node 402 in a receive direction that corresponds to the direction 402*f*. The UE 404*a* may also transmit a beamformed signal to the network node 402 in a direction that corresponds to the direction 402*f*. The UE 404*b* may receive the beamformed signal from the network node 402 in a receive direction that corresponds to the direction 402*e*. The UE 404*b* may also transmit a beamformed signal to the network node 402 in a direction that corresponds to the direction 402*e*. The UE 404*c* may receive the beamformed signal from the network node 402 in a receive direction that corresponds to the direction 402*d*. The UE 404*c* may also transmit a beamformed signal to the network node 402 in a direction that corresponds to the direction 402*d*.

The network node 402 and the UE 404*a*, the UE 404*b*, or the UE 404*c* may perform beam training to determine the best receive and transmit directions for each pair of the network node 402 and the UE 404*a*, the UE 404*b*, or the UE 404*c*. The transmit and receive directions for the network node 402 may or may not be the same. The transmit and receive directions for the UE 404*a*, the UE 404*b*, or the UE 404*c* may or may not be the same. The term beam may be otherwise referred to as "spatial filter." Beamforming may be otherwise referred to as "spatial filtering." As used herein, the term "beam" may correspond to "spatial filter."

In response to different conditions, the UE 404*a*, the UE 404*b*, or the UE 404*c* may determine to switch beams, e.g., between beams 402*a*-402*f* based on a movement. The beam at the UE the UE 404*a*, the UE 404*b*, or the UE 404*c* may be used for reception of downlink communication and/or transmission of uplink communication. In some examples, the network node 402 may send a transmission that triggers a beam switch by the UE the UE 404*a*, the UE 404*b*, or the UE 404*c*. A TCI state may include quasi-co-location (QCL) information that the UE can use to derive timing/frequency error and/or transmission/reception spatial filtering for transmitting/receiving a signal. Two antenna ports are said to be quasi co-located if properties of the channel over which a symbol on one antenna port is conveyed can be inferred from the channel over which a symbol on the other antenna port is conveyed. The base station may indicate a TCI state to the UE as a transmission configuration that indicates QCL relationships between one signal (e.g., a reference signal) and the signal to be transmitted/received. For example, a TCI state may indicate a QCL relationship between DL RSs in one RS set and PDSCH/PDCCH DM-RS ports. TCI states can provide information about different beam selections for the UE to use for transmitting/receiving various signals. For example, the network node 402 may indicate a TCI state change, and in response, the UE 404*a*, the UE 404*b*, or the UE 404*c* may switch to a new beam (which may be otherwise referred to as performing a beam switch) according to the new TCI state indicated by the network node 402.

To perform beamforming, a beamformer at the network node 402 may control a phase and a relative amplitude of a signal at each transmit antenna at the network node 402. A beamformer at the network node 402 may also control width of a beam. A wider transmit beam may provide better coverage (e.g., larger area of coverage), but a narrower transmit beam may provide a better reference signal received quality (RSRQ), a better received signal strength indicator (RSSI), a better reference signal received power (RSRP), or a better signal to interference and noise ratio (SINR) for the narrower direction of the beam. Azimuth beamforming allows covering UEs in the horizontal plane, while elevated beamforming allows covering UEs in the vertical plane. An azimuth beamforming module of a beamformer at the network node 402 may control both the transmit antenna azimuth tilt angle and a beam width. The term "beam width" may refer to an aperture angle from which the power of the beam is radiated at a transmit beam associated with the network node. The term "antenna tilt angle" may refer to a rotation of the antenna around an axis at the network node. While a narrower beam provides better metric (e.g., high RSSI) for a relatively small area, a wider beam provides worse metric (e.g., a lower RSSI) but for a larger area. Therefore, if UEs, such as the UE 404*a*, the UE 404*b*, or the UE 404*c*, are scattered in diverse directions, better metrics and larger coverage area may be balanced by the network node to achieve both a suitable coverage area and suitable metrics. However, if a tall building, such as a building 406 is present, the beamforming process may be tricky. For example, the network node 402 may be providing a good quality signal (e.g., good RSSI) for one or more particular altitudes (e.g., the ones that one or more particular antenna elevation tilt may be pointing at), which may correspond to one or more floors at the building 406. The other floors that do not correspond to the one or more particular altitudes may suffer from a degraded RSSI. Because the UEs in the building may be moving across different floors, the network node may be adjusting its antenna's elevated tilt to the corresponding altitude of the floors of the UEs to provide better coverage. The network node may be performing second order adjustment to widen the antenna elevated beam profile and may adjust the antenna tilt and beam width (controlled by an elevated beamforming module) to provide suitable RSSI for UEs in the building. Because the number of UEs at each floor may change over time, a closed loop tracking and adapting the antenna at the network node may be used to provide suitable RSSI and coverage for the UEs based on aspects provided herein. Aspects provided herein may facilitate a UE to signal its altitude (e.g., elevation) to the network node and the network node may accordingly use the altitude information as a-priory information regarding beamforming, beam selection, antenna tilt angle, beam selection time, or scan specification, or the like. By using the altitude information, the network node may be able to apply a more suitable beam for the UE. Based on some aspects provided herein, the UE may report, at a particular rate or based on request(s) from the network node, the altitude information associated with the UE. Based on the reported altitude information, the network node may adjust antenna tilt and beam width at the network node. In some aspects, the altitude information may be reported upon establishing a connection, such as after a RACH procedure. In some aspects, the altitude information may be reported based on receiving a request from the network node, which may trigger one particular aperiodic report of the altitude or trigger periodic report of the altitude. In some aspects, the altitude information may be reported periodically after establishing a connection, such as after a RACH procedure.

Figure 5:
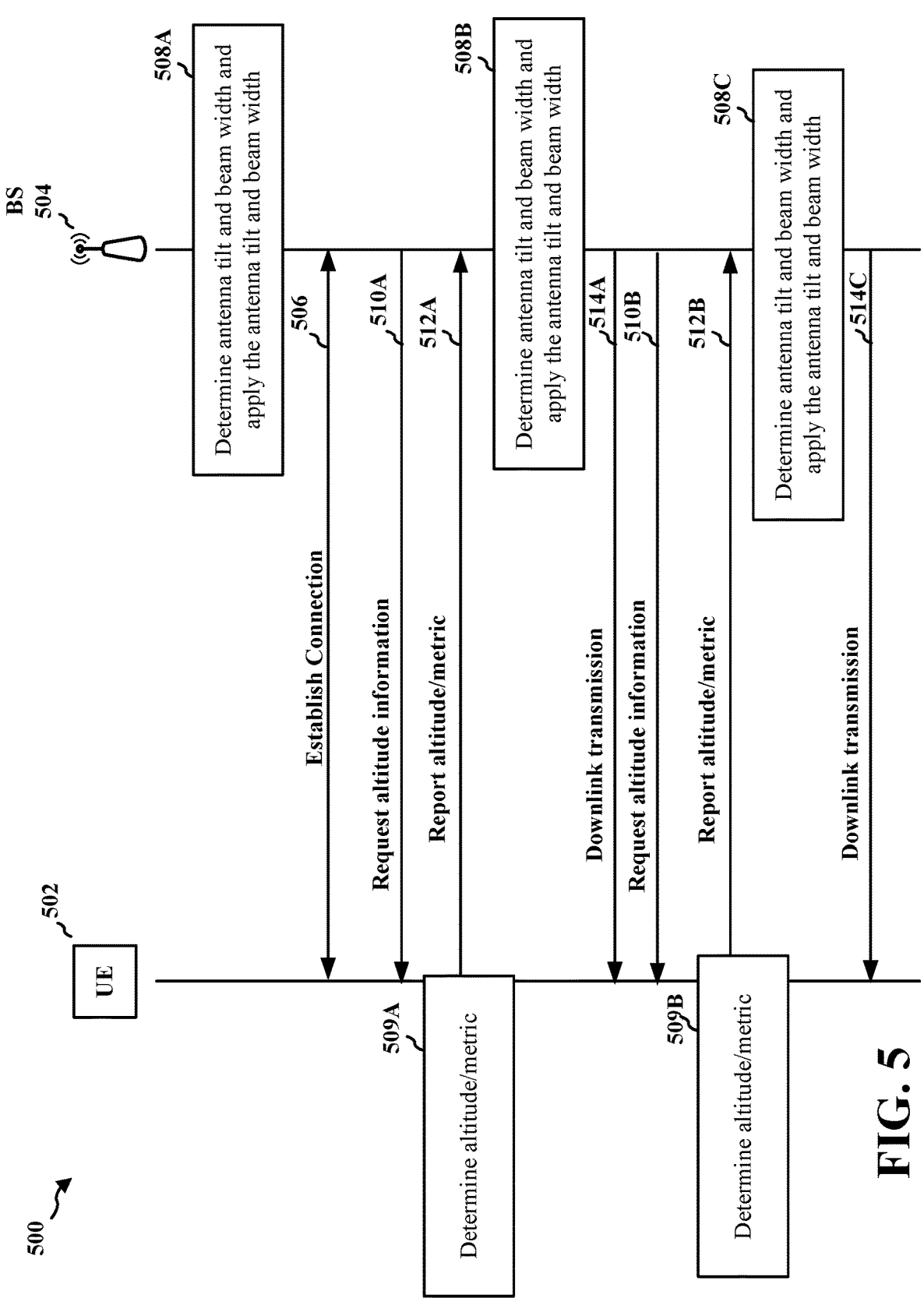
FIG. 5 is a diagram illustrating example communications between a network entity and a UE, in accordance with various aspects of the present disclosure.

FIG. 5 is a diagram 500 illustrating example communications between a network node 504 and a UE 502, in accordance with various aspects of the present disclosure. As illustrated in FIG. 5, at 506, the network node 504 may establish a connection with the UE 502, which may be facilitated by a RACH procedure. In some aspects, at 508A, the network node 504 may determine an antenna tilt and a beam width and may apply the antenna tilt and the beam width by adjusting an antenna at the network node 504. For example, the network node 504 may adjust its elevated beamforming according to $\theta_{tilt}$, $\Delta\theta$, where $\theta_{tilt}$ may correspond to an antenna tilt angle and $\Delta\theta$ may correspond to the beam width. In some aspects, the connection established at 506 may be based on the antenna tilt and the beam width determined at 508A. As an example, the network node 504 may determine the antenna tilt and the beam width at 508A based on a default antenna tilt and beam width.

In some aspects, after establishing connection at 506, the UE 502 may report altitude information in a uplink transmission 512A to the network node 504. In some aspects, the network node 506 may transmit a request 510A to the UE 502 to request the altitude information and the UE 502 may transmit the uplink transmission 512A to report the altitude information associated with the UE 502 upon receiving the request 510A. In some aspects, the request may be carried in a PDCCH.

In some aspects, the UE 502 may transmit the uplink transmission 512A to report the altitude information associated with the UE 502 without receiving a request. In some aspects, the 502 may transmit the uplink transmission 512A to report the altitude information associated with the UE 502 based on a periodicity associated with reporting the altitude information, which may be configured via radio resource control (RRC) signaling, downlink control information (DCI), or MAC control element (MAC-CE).

In some aspects, after receiving the altitude information by receiving the uplink transmission 512A, the network node 504 may, at 508B, may update (e.g., which may include determine and apply) its elevated beamforming (e.g., elevation beam) by updating antenna tilt and beam width $\theta_{tilt}$, $\Delta\theta$ based on the altitude information received in the uplink transmission 512A. In some aspects, the network node 504 may periodically update its elevated beamforming by updating $\theta_{tilt}$, $\Delta\theta$ based on the altitude information received in various uplink transmissions from different UEs (e.g., each UE served by the network node 504) within a time period, including the uplink transmission 512A. In some aspects, in the uplink transmission 512A, in addition to the altitude information, at least one metric associated with a connection between the UE 502 and the network node 504, such as RSSI, RSRQ, RSRP, SINR, or the like, may also be included. In some aspects, at 508B, the network node 504 may update its elevated beamforming by updating antenna tilt and beam width $\theta_{tilt}$, $\Delta\theta$ based on the altitude information and the at least one metric included in the uplink transmission 512A. In some aspects, the network node 504 may periodically update its elevated beamforming by updating $\theta_{tilt}$, $\Delta\theta$ based on the altitude information and metrics received in various uplink transmissions from different UEs within a time period, including the uplink transmission 512A. The update at 508B may be part of the periodic update.

In some aspects, to report the altitude information and the at least one metric, the UE 502 may, at 509A, perform an altitude estimation and metric measurement (such as RSSI measurement). The altitude estimation may be performed based on global navigation satellite system (GNSS) or a sensor at the UE 502, such as an air pressure sensor or another sensor.

After updating (e.g., which may include determine and apply) its elevated beamforming (e.g., elevation beam) by updating antenna tilt and beam width $\theta_{tilt}$, $\Delta\theta$, the network node 504 may transmit a downlink transmission 514A to the UE 502, which may be a PDSCH or a PDCCH, based on the updated antenna tilt and beam width $\theta_{tilt}$, $\Delta\theta$. In some aspects, at some time after receiving the downlink transmission 514A, the UE 502 may further transmit a uplink transmission 512B to report the altitude information or at least one metric associated with the connection (e.g., based on the downlink transmission 514A) between the UE 502 and the network node 504. In some aspects, the altitude information or at least one metric in the uplink transmission 512B may be transmitted based on reception of a request 510B. In some aspects, altitude information or at least one metric in the uplink transmission 512B may be transmitted based a periodicity. In some aspects, altitude information or at least one metric in the uplink transmission 512B may be transmitted without a request. In some aspects, to report the altitude information and the at least one metric, the UE 502 may, at 509B, perform an altitude estimation and metric measurement (such as RSSI measurement). The altitude estimation may be performed based on global navigation satellite system (GNSS) or a sensor at the UE 502, such as an air pressure sensor or another sensor.

In some aspects, at 508C, the network node 504 may update its elevated beamforming by updating antenna tilt and beam width $\theta_{tilt}$, $\Delta\theta$ based on the altitude information and the at least one metric included in the uplink transmission 512B. In some aspects, the network node 504 may periodically update its elevated beamforming by updating antenna tilt and beam width $\theta_{tilt}$, $\Delta\theta$ based on the altitude information and metrics received in various uplink transmissions from different UEs within a time period, including the uplink transmission 512A. The update at 508C may be part of the periodic update. In some aspects, the second uplink transmission 512B may also include the altitude information and the at one metric included in the uplink transmission 512A. In some aspects, the second uplink transmission 512B may include the altitude information and the at one metric by including information with regard to a change in the altitude or the at least one metric compared to last reported information (e.g., the altitude information and the at one metric included in the uplink transmission 512A).

After updating (e.g., which may include determine and apply) its elevated beamforming (e.g., elevation beam) by updating antenna tilt and beam width $\theta_{tilt}$, $\Delta\theta$, the network node 504 may transmit a downlink transmission 514C to the UE 502, which may be a PDSCH or a PDCCH, based on the updated antenna tilt and beam width $\theta_{tilt}$, $\Delta\theta$.

In some aspects, as part of 508B, the network node 504 may gather all reported altitude information and metric(s) from various UEs including the UE 502 and use the reported altitude information and metric(s) as an input for updating the antenna tilt and beam width $\theta_{tilt}$, $\Delta\theta$. As an example, in some aspects, the network node 504 may first tilt (e.g., electronically or mechanically) an antenna toward an area (e.g., which may correspond to an altitude range) associated with the most amount of UEs (e.g., determined based on all the reported altitude information and metric(s)), maximizing the RSSI in that area. Then the network node 504 may adjust (e.g., widening or narrowing) the beam width so that the width may be sufficiently wide enough to cover the UEs without being too wide in order to provide more equal RSSI also for another area, such as a second most populated altitude range (compared with the most UE-populated altitude). In another example, in some aspects, the network node 504 may tilting the antenna (electronically or mechanically) towards a weighted average altitude associated with all the UEs including the UE 502, then widen or narrowing the antenna beam, based on a weighted standard deviation of the altitudes.

Similarly, as part of 508C, the network node 504 may gather all reported altitude information and metric(s) from various UEs including the UE 502 and use the reported altitude information and metric(s) as an input for updating the antenna tilt and beam width $\theta_{tilt}$, $\Delta\theta$. As an example, in some aspects, the network node 504 may first tilt (e.g., electronically or mechanically) an antenna toward an area (e.g., which may correspond to an altitude range) associated with the most amount of UEs (e.g., determined based on all the reported altitude information and metric(s)), maximizing the RSSI in that area. Then the network node 504 may adjust (e.g., widening or narrowing) the beam width so that the width may be sufficiently wide enough to cover the UEs without being too wide in order to provide more equal RSSI also for another area, such as a second most populated altitude range (compared with the most UE-populated altitude). In another example, in some aspects, the network node 504 may tilting the antenna (electronically or mechanically) towards a weighted average altitude associated with all the UEs including the UE 502, then widen or narrowing the antenna beam, based on a weighted standard deviation of the altitudes.

The update at 508B and 508C may be part of a loop that tracks and updates the antenna tilt and beam width $\theta_{tilt}$, $\Delta\theta$ at the network node 504. The network node 504 may be configured to periodically update the antenna tilt and beam width $\theta_{tilt}$, $\Delta\theta$. In some aspects, network node 504 may also determine to cease updating the antenna tilt and beam width $\theta_{tilt}$, $\Delta\theta$ for a period of time based on the reported altitude information and metric(s) from various UEs, such as based on the reported metrics(s) being within a threshold or having a standard deviation smaller than a threshold.

FIG. 6 is a flowchart 600 of a method of wireless communication. The method may be performed by a UE (e.g., the UE 104, the UE 404a, the UE 404b, the UE 404c, the UE 502; the apparatus 804). The method may facilitate a UE to signal its altitude (e.g., elevation) to the network node and the network node may accordingly use the altitude information as an a-priory information regarding beamforming, beam selection, antenna tilt angle, beam selection time, or scan specification, or the like. By using the altitude information, the network node may be able to apply a more suitable beam for the UE.

At 602, the UE may establish a connection with a network node based on a first antenna tilt angle and a first beam width. For example, the UE 502 may establish a connection with a network node based on a first antenna tilt angle and a first beam width. In some aspects, 602 may be performed by adjust component 198.

At 604, the UE may transmit, to the network node, a uplink transmission to report an altitude associated with the UE and a metric associated with the connection. For example, the UE 502 may transmit, to the network node, a uplink transmission to report an altitude associated with the UE and a metric associated with the connection. In some aspects, 604 may be performed by adjust component 198. In some aspects, the metric includes one of a reference signal received quality (RSRQ), a received signal strength indicator (RSSI), a reference signal received power (RSRP), or a signal to interference and noise ratio (SINR). In some aspects, transmit the uplink transmission to report the altitude associated with the UE and the metric associated with the connection, the UE may receive, from the network node, a request to report the altitude associated with the UE and the metric associated with the connection, and transmit, to the network node based on the request, the uplink transmission to report the altitude associated with the UE and the metric associated with the connection. In some aspects, transmit the uplink transmission to report the altitude associated with the UE and the metric associated with the connection, the UE may perform, upon reception of the request, an altitude estimation and a measurement to determine the altitude and the metric. In some aspects, the altitude estimation is based on a global navigation satellite system (GNSS) report or an air pressure sensor.

At 606, the UE may receive, from the network node, a downlink transmission based on a second antenna tilt angle and a second beam width, where the second antenna tilt angle and the second beam width based on the altitude and the metric. For example, the UE 502 may receive, from the network node, a downlink transmission based on a second antenna tilt angle and a second beam width, where the second antenna tilt angle and the second beam width based on the altitude and the metric. In some aspects, 606 may be performed by adjust component 198. In some aspects, the request is based on a physical downlink control channel (PDCCH) and the uplink transmission is based on a physical uplink control channel (PUCCH).

In some aspects, the UE may also transmit, to the network node, a second uplink transmission to report a second altitude associated with the UE and a second metric associated with the connection, and receive, from the network node, a second downlink transmission based on a third antenna tilt angle and a third beam width, where the third antenna tilt angle and the third beam width based on the second altitude and the second metric. In some aspects, to transmit the second uplink transmission to report the second altitude associated with the UE and the second metric associated with the connection, the UE may receive, from the network node, a request to report the second altitude associated with the UE and the second metric associated with the connection, and transmit, to the network node based on the request, the second uplink transmission to report the second altitude associated with the UE and the second metric associated with the connection.

FIG. 7 is a flowchart 700 of a method of wireless communication. The method may be performed by a network entity (e.g., the base station 102, the network node 402, the network node 504, the network entity 802, the network entity 902). The method may facilitate a UE to signal its altitude (e.g., elevation) to the network node and the network node may accordingly use the altitude information as an a-priory information regarding beamforming, beam selection, antenna tilt angle, beam selection time, or scan specification, or the like. By using the altitude information, the network node may be able to apply a more suitable beam for the UE.

At 702, the network entity may establish a connection with a UE. For example, the network node 504 may establish a connection with a UE 502. In some aspects, 702 may be performed by adjust component 199. In some aspects, as part of 702, the network node 504 may, at 703A, determine a first antenna tilt angle and a first beam width and may, at 703B, adjust a beam associated with the connection based on the first antenna tilt angle and the first beam width.

At 704, the network entity may receive a uplink transmission to report an altitude associated with the UE and a metric associated with the connection. For example, the network node 504 may receive a uplink transmission to report an altitude associated with the UE and a metric associated with the connection. In some aspects, 704 may be performed by adjust component 199. In some aspects, the metric includes one of a reference signal received quality (RSRQ), a received signal strength indicator (RSSI), a reference signal received power (RSRP), or a signal to interference and noise ratio (SINR). In some aspects, to receive the uplink transmission to report the altitude associated with the UE and the metric associated with the connection, the network entity may transmit, for the UE, a request to report the altitude associated with the UE and the metric associated with the connection, and receive, based on the request, the uplink transmission to report the altitude associated with the UE and the metric associated with the connection. In some aspects, to transmit the downlink transmission, the at least one processor, individually or in any combination, the network entity may adjust the beam associated with the connection based on the second antenna tilt angle and the second beam width.

At 706, the network entity may transmit, for the UE, a downlink transmission based on a second antenna tilt angle and a second beam width, where the second antenna tilt angle and the second beam width based on the altitude and the metric. For example, the network node 504 may transmit, for the UE, a downlink transmission based on a second antenna tilt angle and a second beam width, where the second antenna tilt angle and the second beam width based on the altitude and the metric. In some aspects, 706 may be performed by adjust component 199. In some aspects, the request is based on a physical downlink control channel (PDCCH) and the uplink transmission is based on a physical uplink control channel (PUCCH).

In some aspects, the network entity may receive a second uplink transmission to report a second altitude associated with the UE and a second metric associated with the connection and may transmit, for the UE, a second downlink transmission based on a third antenna tilt angle and a third beam width, where the third antenna tilt angle and the third beam width based on the second altitude and the second metric. In some aspects, to receive the second uplink transmission to report the second altitude associated with the UE and the second metric associated with the connection, the network entity may transmit, for the UE, a request to report the second altitude associated with the UE and the second metric associated with the connection, and receive, based on the request, the second uplink transmission to report the second altitude associated with the UE and the second metric associated with the connection.

Figure 8:
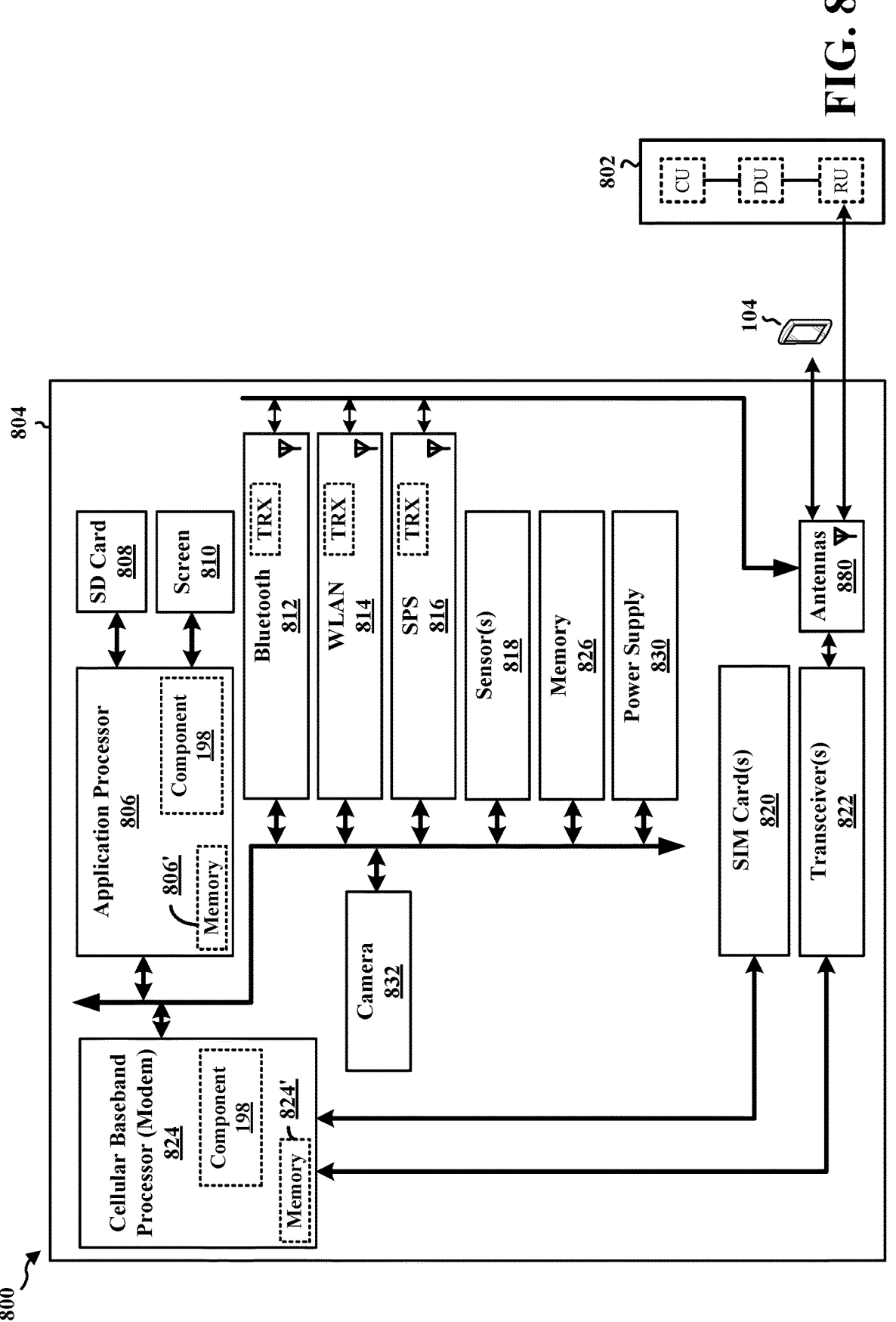
FIG. 8 is a diagram illustrating an example of a hardware implementation for an example apparatus and/or network entity, in accordance with various aspects of the present disclosure.

FIG. 8 is a diagram 800 illustrating an example of a hardware implementation for an apparatus 804. The apparatus 804 may be a UE, a component of a UE, or may implement UE functionality. In some aspects, the apparatus 804 may include at least one cellular baseband processor 824 (also referred to as a modem) coupled to one or more transceivers 822 (e.g., cellular RF transceiver). The cellular baseband processor(s) 824 may include at least one on-chip memory 824'. In some aspects, the apparatus 804 may further include one or more subscriber identity modules (SIM) cards 820 and at least one application processor 806 coupled to a secure digital (SD) card 808 and a screen 810. The application processor(s) 806 may include on-chip memory 806'. In some aspects, the apparatus 804 may further include a Bluetooth module 812, a WLAN module 814, an SPS module 816 (e.g., GNSS module), one or more sensor modules 818 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 826, a power supply 830, and/or a camera 832. The Bluetooth module 812, the WLAN module 814, and the SPS module 816 may include an on-chip transceiver (TRX) (or in some cases, just a receiver (RX)). The Bluetooth module 812, the WLAN module 814, and the SPS module 816 may include their own dedicated antennas and/or utilize the antennas 880 for communication. The cellular baseband processor(s) 824 communicates through the transceiver(s) 822 via one or more antennas 880 with the UE 104 and/or with an RU associated with a network entity 802. The cellular baseband processor(s) 824 and the application processor(s) 806 may each include a computer-readable medium/memory 824', 806', respectively. The additional memory modules 826 may also be considered a computer-readable medium/memory. Each computer-readable medium/memory 824', 806', 826 may be non-transitory. The cellular baseband processor(s) 824 and the application processor(s) 806 are each responsible for general processing, including the execution of software stored on the computer-readable medium/memory. The software, when executed by the cellular baseband processor(s) 824/application processor(s) 806, causes the cellular baseband processor(s) 824/application processor(s) 806 to perform the various functions described supra. The computer-readable medium/memory may also be used for storing data that is manipulated by the cellular baseband processor(s) 824/application processor(s) 806 when executing software. The cellular baseband processor(s) 824/application processor(s) 806 may be a component of the UE 350 and may include the at least one memory 360 and/or at least one of the TX processor 368, the RX processor 356, and the controller/processor 359. In one configuration, the apparatus 804 may be at least one processor chip (modem and/or application) and include just the cellular baseband processor(s) 824 and/or the application processor(s) 806, and in another configuration, the apparatus 804 may be the entire UE (e.g., see UE 350 of FIG. 3) and include the additional modules of the apparatus 804.

As discussed supra, the adjust component 198 may be configured to establish a connection with a network node based on a first antenna tilt angle and a first beam width. In some aspects, the adjust component 198 may be further configured to transmit, to the network node, a uplink transmission to report an altitude associated with the UE and a metric associated with the connection. In some aspects, the adjust component 198 may be further configured to receive, from the network node, a downlink transmission based on a second antenna tilt angle and a second beam width, where the second antenna tilt angle and the second beam width based on the altitude and the metric. The adjust component 198 may be within the cellular baseband processor(s) 824, the application processor(s) 806, or both the cellular baseband processor(s) 824 and the application processor(s) 806. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. As shown, the apparatus 804 may include a variety of components configured for various functions. In one configuration, the apparatus 804, and in particular the cellular baseband processor(s) 824 and/or the application processor(s) 806, may include means for establishing a connection with a network node based on a first antenna tilt angle and a first beam width. In some aspects, the apparatus 804 may include means for transmitting, to the network node, a uplink transmission to report an altitude associated with the UE and a metric associated with the connection. In some aspects, the apparatus 804 may include means for receiving, from the network node, a downlink transmission based on a second antenna tilt angle and a second beam width, where the second antenna tilt angle and the second beam width based on the altitude and the metric. In some aspects, the apparatus 804 may include means for receiving, from the network node, a request to report the altitude associated with the UE and the metric associated with the connection. In some aspects, the apparatus 804 may include means for transmitting, to the network node based on the request, the uplink transmission to report the altitude associated with the UE and the metric associated with the connection. In some aspects, the apparatus 804 may include means for performing, upon reception of the request, an altitude estimation and a measurement to determine the altitude and the metric. In some aspects, the apparatus 804 may include means for transmitting, to the network node, a second uplink transmission to report a second altitude associated with the UE and a second metric associated with the connection. In some aspects, the apparatus 804 may include means for receiving, from the network node, a second downlink transmission based on a third antenna tilt angle and a third beam width, where the third antenna tilt angle and the third beam width based on the second altitude and the second metric. In some aspects, the apparatus 804 may include means for receiving, from the network node, a request to report the second altitude associated with the UE and the second metric associated with the connection. In some aspects, the apparatus 804 may include means for transmitting, to the network node based on the request, the second uplink transmission to report the second altitude associated with the UE and the second metric associated with the connection. The means may be the component 198 of the apparatus 804 configured to perform the functions recited by the means. As described supra, the apparatus 804 may include the TX processor 368, the RX processor 356, and the controller/processor 359. As such, in one configuration, the means may be the TX processor 368, the RX processor 356, and/or the controller/processor 359 configured to perform the functions recited by the means.

Figure 9:
FIG. 9 is a diagram illustrating an example of a hardware implementation for an example network entity, in accordance with various aspects of the present disclosure.

FIG. 9 is a diagram 900 illustrating an example of a hardware implementation for a network entity 902. The network entity 902 may be a BS, a component of a BS, or may implement BS functionality. The network entity 902 may include at least one of a CU 910, a DU 930, or an RU 940. For example, depending on the layer functionality handled by the component 199, the network entity 902 may include the CU 910; both the CU 910 and the DU 930; each of the CU 910, the DU 930, and the RU 940; the DU 930; both the DU 930 and the RU 940; or the RU 940. The CU 910 may include at least one CU processor 912. The CU processor(s) 912 may include on-chip memory 912'. In some aspects, the CU 910 may further include additional memory modules 914 and a communications interface 918. The CU 910 communicates with the DU 930 through a midhaul link, such as an F1 interface. The DU 930 may include at least one DU processor 932. The DU processor(s) 932 may include on-chip memory 932'. In some aspects, the DU 930 may further include additional memory modules 934 and a communications interface 938. The DU 930 communicates with the RU 940 through a fronthaul link. The RU 940 may include at least one RU processor 942. The RU processor(s) 942 may include on-chip memory 942'. In some aspects, the RU 940 may further include additional memory modules 944, one or more transceivers 946, antennas 980, and a communications interface 948. The RU 940 communicates with the UE 104. The on-chip memory 912', 932', 942' and the additional memory modules 914, 934, 944 may each be considered a computer-readable medium/memory. Each computer-readable medium/memory may be non-transitory. Each of the processors 912, 932, 942 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the base station 102 may include a adjust component 199. In some aspects, the adjust component 199 may be configured to establish a connection with a user equipment (UE). In some aspects, the adjust component 199 may be further configured to determine a first antenna tilt angle and a first beam width. In some aspects, the adjust component 199 may be further configured to adjust a beam associated with the connection based on the first antenna tilt angle and the first beam width. In some aspects, the adjust component 199 may be further configured to receive a uplink transmission to report an altitude associated with the UE and a metric associated with the connection. In some aspects, the adjust component 199 may be further configured to transmit, for the UE, a downlink transmission based on a second antenna tilt angle and a second beam width, where the second antenna tilt angle and the second beam width based on the altitude and the metric. The adjust component 199 may be within one or more processors of one or more of the CU 910, DU 930, and the RU 940. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. The network entity 902 may include a variety of components configured for various functions. In one configuration, the network entity 902 may include means for establishing a connection with a user equipment (UE). In some aspects, the network entity 902 may include means for determining a first antenna tilt angle and a first beam width. In some aspects, the network entity 902 may include means for adjusting a beam associated with the connection based on the first antenna tilt angle and the first beam width. In some aspects, the network entity 902 may include means for receiving a uplink transmission to report an altitude associated with the UE and a metric associated with the connection. In some aspects, the network entity 902 may include means for transmitting, for the UE, a downlink transmission based on a second antenna tilt angle and a second beam width, where the second antenna tilt angle and the second beam width based on the altitude and the metric. In some aspects, the network entity 902 may include means for transmitting, for the UE, a request to report the altitude associated with the UE and the metric associated with the connection. In some aspects, the network entity 902 may include means for receiving, based on the request, the uplink transmission to report the altitude associated with the UE and the metric associated with the connection. In some aspects, the network entity 902 may include means for adjusting the beam associated with the connection based on the second antenna tilt angle and the second beam width. In some aspects, the network entity 902 may include means for receiving a second uplink transmission to report a second altitude associated with the UE and a second metric associated with the connection. In some aspects, the network entity 902 may include means for transmitting, for the UE, a second downlink transmission based on a third antenna tilt angle and a third beam width, where the third antenna tilt angle and the third beam width based on the second altitude and the second metric. In some aspects, the network entity 902 may include means for transmitting, for the UE, a request to report the second altitude associated with the UE and the second metric associated with the connection. In some aspects, the network entity 902 may include means for receiving, based on the request, the second uplink transmission to report the second altitude associated with the UE and the second metric associated with the connection. The means may be the component 199 of the network entity 902 configured to perform the functions recited by the means. As described supra, the network entity 902 may include the TX processor 316, the RX processor 370, and the controller/processor 375. As such, in one configuration, the means may be the TX processor 316, the RX processor 370, and/or the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. When at least one processor is configured to perform a set of functions, the at least one processor, individually or in any combination, is configured to perform the set of functions. Accordingly, each processor of the at least one processor may be configured to perform a particular subset of the set of functions, where the subset is the full set, a proper subset of the set, or an empty subset of the set. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication performed by a user equipment (UE), including: establishing a connection with a network node based on a first antenna tilt angle and a first beam width; transmitting, to the network node, a uplink transmission to report an altitude associated with the UE and a metric associated with the connection; and receiving, from the network node, a downlink transmission based on a second antenna tilt angle and a second beam width, where the second antenna tilt angle and the second beam width based on the altitude and the metric.

Aspect 2 is the method of aspect 1, where the metric includes one of a reference signal received quality (RSRQ), a received signal strength indicator (RSSI), a reference signal received power (RSRP), or a signal to interference and noise ratio (SINR).

Aspect 3 is the method of any of aspects 1-2, where transmitting the uplink transmission to report the altitude associated with the UE and the metric associated with the connection includes: receiving, from the network node, a request to report the altitude associated with the UE and the metric associated with the connection; and transmitting, to the network node based on the request, the uplink transmission to report the altitude associated with the UE and the metric associated with the connection.

Aspect 4 is the method of aspect 3, where transmitting the uplink transmission to report the altitude associated with the UE and the metric associated with the connection includes: performing, upon reception of the request, an altitude estimation and a measurement to determine the altitude and the metric.

Aspect 5 is the method of aspect 4, where the altitude estimation is based on a global navigation satellite system (GNSS) report or an air pressure sensor.

Aspect 6 is the method of any of aspects 4-5, where the request is based on a physical downlink control channel (PDCCH) and the uplink transmission is based on a physical uplink control channel (PUCCH).

Aspect 7 is the method of any of aspects 1-6, further including: transmitting, to the network node, a second uplink transmission to report a second altitude associated with the UE and a second metric associated with the connection; and receiving, from the network node, a second downlink transmission based on a third antenna tilt angle and a third beam width, where the third antenna tilt angle and the third beam width based on the second altitude and the second metric.

Aspect 8 is the method of aspect 7, where transmitting the second uplink transmission to report the second altitude associated with the UE and the second metric associated with the connection further includes: receiving, from the network node, a request to report the second altitude associated with the UE and the second metric associated with the connection; and transmitting, to the network node based on the request, the second uplink transmission to report the second altitude associated with the UE and the second metric associated with the connection.

Aspect 9 is a method for wireless communication performed by a network node, including: establishing a connection with a user equipment (UE); determining a first antenna tilt angle and a first beam width; adjusting a beam associated with the connection based on the first antenna tilt angle and the first beam width; receiving a uplink transmission to report an altitude associated with the UE and a metric associated with the connection; and transmitting, for the UE, a downlink transmission based on a second antenna tilt angle and a second beam width, where the second antenna tilt angle and the second beam width based on the altitude and the metric.

Aspect 10 is the method of aspect 9, where the metric includes one of a reference signal received quality (RSRQ), a received signal strength indicator (RSSI), a reference signal received power (RSRP), or a signal to interference and noise ratio (SINR).

Aspect 11 is the method of any of aspects 9-10, where receiving the uplink transmission to report the altitude associated with the UE and the metric associated with the connection includes: transmitting, for the UE, a request to report the altitude associated with the UE and the metric associated with the connection; and receiving, based on the request, the uplink transmission to report the altitude associated with the UE and the metric associated with the connection.

Aspect 12 is the method of aspect 11, where transmitting the downlink transmission includes: adjusting the beam associated with the connection based on the second antenna tilt angle and the second beam width.

Aspect 13 is the method of any of aspects 11-12, where the request is based on a physical downlink control channel (PDCCH) and the uplink transmission is based on a physical uplink control channel (PUCCH).

Aspect 14 is the method of any of aspects 9-13, further including: receiving a second uplink transmission to report a second altitude associated with the UE and a second metric associated with the connection; and transmitting, for the UE, a second downlink transmission based on a third antenna tilt angle and a third beam width, where the third antenna tilt angle and the third beam width based on the second altitude and the second metric.

Aspect 15 is the method of aspect 14, where receiving the second uplink transmission to report the second altitude associated with the UE and the second metric associated with the connection includes: transmitting, for the UE, a request to report the second altitude associated with the UE and the second metric associated with the connection; and receiving, based on the request, the second uplink transmission to report the second altitude associated with the UE and the second metric associated with the connection.

Aspect 16 is an apparatus for wireless communication at a UE including at least one memory and at least one processor coupled to the at least one memory and, based at least in part on information stored in the at least one memory, the at least one processor is configured, individually or in combination, to cause the UE to implement any of aspects 1 to 8.

Aspect 17 is the apparatus of aspect 16, further including one or more transceivers or one or more antennas coupled to the at least one processor.

Aspect 18 is an apparatus for wireless communication at a UE including means for implementing any of aspects 1 to 8.

Aspect 19 is a computer-readable medium (e.g., a non-transitory computer-readable medium) storing computer executable code, where the code when executed by at least one processor causes the UE to implement any of aspects 1 to 8.

Aspect 20 is an apparatus for wireless communication at a network node including at least one memory and at least one processor coupled to the at least one memory and, based at least in part on information stored in the at least one memory, the at least one processor is configured, individually or in combination, to cause the network node to implement any of aspects 9 to 15.

Aspect 21 is the apparatus of aspect 20, further including one or more transceivers or one or more antennas coupled to the at least one processor.

Aspect 22 is an apparatus for wireless communication at a network node including means for implementing any of aspects 9 to 15.

Aspect 23 is a computer-readable medium (e.g., a non-transitory computer-readable medium) storing computer executable code, where the code when executed by at least one processor causes the network node to implement any of aspects 9 to 15.

What is claimed is:

1. An apparatus for wireless communication at a user equipment (UE), comprising:
at least one memory; and
at least one processor coupled to the at least one memory and, based at least in part on information stored in the at least one memory, the at least one processor is configured to cause the UE to:
establish a connection with a network node based on a first antenna tilt angle and a first beam width;
transmit, to the network node, an uplink transmission to report an altitude associated with the UE and a metric associated with the connection; and
receive, from the network node, a downlink transmission based on a second antenna tilt angle and a second beam width, wherein the second antenna tilt angle and the second beam width based on the altitude and the metric, and wherein the second antenna tilt angle is based on a weighted average altitude associated with a group of UEs.

2. The apparatus of claim 1, further comprising:
at least one transceiver coupled to the at least one processor, wherein the metric comprises one of a reference signal received quality (RSRQ), a received signal strength indicator (RSSI), a reference signal received power (RSRP), or a signal to interference and noise ratio (SINR).

3. The apparatus of claim 1, wherein to transmit the uplink transmission to report the altitude associated with the UE and the metric associated with the connection, the at least one processor is configured to cause the UE to:

receive, from the network node, a request to report the altitude associated with the UE and the metric associated with the connection; and transmit, to the network node based on the request, the uplink transmission to report the altitude associated with the UE and the metric associated with the connection.

4. The apparatus of claim 3, wherein to transmit the uplink transmission to report the altitude associated with the UE and the metric associated with the connection, the at least one processor is configured to cause the UE to:

perform, upon reception of the request, an altitude estimation and a measurement to determine the altitude and the metric.

5. The apparatus of claim 4, wherein the altitude estimation is based on a global navigation satellite system (GNSS) report or an air pressure sensor.

6. The apparatus of claim 4, wherein the request is based on a physical downlink control channel (PDCCH) and the uplink transmission is based on a physical uplink control channel (PUCCH).

7. The apparatus of claim 1, wherein the at least one processor, is further configured to cause the UE to:

transmit, to the network node, a second uplink transmission to report a second altitude associated with the UE and a second metric associated with the connection; and receive, from the network node, a second downlink transmission based on a third antenna tilt angle and a third beam width, wherein the third antenna tilt angle and the third beam width based on the second altitude and the second metric.

8. The apparatus of claim 7, wherein to transmit the second uplink transmission to report the second altitude associated with the UE and the second metric associated with the connection, the at least one processor is configured to cause the UE to:

receive, from the network node, a request to report the second altitude associated with the UE and the second metric associated with the connection; and transmit, to the network node based on the request, the second uplink transmission to report the second altitude associated with the UE and the second metric associated with the connection.

9. An apparatus for wireless communication at a network node, comprising:

at least one memory; and at least one processor coupled to the at least one memory and, based at least in part on information stored in the at least one memory, the at least one processor is configured to cause the network node to:

establish a connection with a user equipment (UE);

determine a first antenna tilt angle and a first beam width;

adjust a beam associated with the connection based on the first antenna tilt angle and the first beam width;

receive an uplink transmission to report an altitude associated with the UE and a metric associated with the connection; and transmit, for the UE, a downlink transmission based on a second antenna tilt angle and a second beam width, wherein the second antenna tilt angle and the second beam width based on the altitude and the metric, and wherein the second antenna tilt angle is based on a weighted average altitude associated with a group of UEs.

10. The apparatus of claim 9, wherein the metric comprises one of a reference signal received quality (RSRQ), a received signal strength indicator (RSSI), a reference signal received power (RSRP), or a signal to interference and noise ratio (SINR).

11. The apparatus of claim 9, wherein to receive the uplink transmission to report the altitude associated with the UE and the metric associated with the connection, the at least one processor is configured to cause the network node to:

transmit, for the UE, a request to report the altitude associated with the UE and the metric associated with the connection; and receive, based on the request, the uplink transmission to report the altitude associated with the UE and the metric associated with the connection.

12. The apparatus of claim 11, wherein to transmit the downlink transmission, the at least one processor is configured to cause the network node to:

adjust the beam associated with the connection based on the second antenna tilt angle and the second beam width.

13. The apparatus of claim 11, wherein the request is based on a physical downlink control channel (PDCCH) and the uplink transmission is based on a physical uplink control channel (PUCCH).

14. The apparatus of claim 9, further comprising at least one transceiver coupled to the at least one processor, wherein the at least one processor is further configured to cause the network node to:

receive a second uplink transmission to report a second altitude associated with the UE and a second metric associated with the connection; and transmit, for the UE, a second downlink transmission based on a third antenna tilt angle and a third beam width, wherein the third antenna tilt angle and the third beam width based on the second altitude and the second metric.

15. The apparatus of claim 14, wherein to receive the second uplink transmission to report the second altitude associated with the UE and the second metric associated with the connection, the at least one processor is configured to cause the network node to:

transmit, for the UE, a request to report the second altitude associated with the UE and the second metric associated with the connection; and receive, based on the request, the second uplink transmission to report the second altitude associated with the UE and the second metric associated with the connection.

16. A method of wireless communication at a user equipment (UE), comprising:

establishing a connection with a network node based on a first antenna tilt angle and a first beam width;

transmitting, to the network node, an uplink transmission to report an altitude associated with the UE and a metric associated with the connection; and receiving, from the network node, a downlink transmission based on a second antenna tilt angle and a second beam width, wherein the second antenna tilt angle and the second beam width based on the altitude and the metric, and wherein the second antenna tilt angle is based on a weighted average altitude associated with a group of UEs.

17. The method of claim 16, wherein the metric comprises one of a reference signal received quality (RSRQ), a received signal strength indicator (RSSI), a reference signal received power (RSRP), or a signal to interference and noise ratio (SINR).

18. The method of claim 16, wherein transmitting the uplink transmission to report the altitude associated with the UE and the metric associated with the connection comprises:
   receiving, from the network node, a request to report the altitude associated with the UE and the metric associated with the connection; and
   transmitting, to the network node based on the request, the uplink transmission to report the altitude associated with the UE and the metric associated with the connection.

19. The method of claim 18, wherein transmitting the uplink transmission to report the altitude associated with the UE and the metric associated with the connection comprises:
   performing, upon reception of the request, an altitude estimation and a measurement to determine the altitude and the metric.

20. The method of claim 19, wherein the altitude estimation is based on a global navigation satellite system (GNSS) report or an air pressure sensor.

21. The method of claim 19, wherein the request is based on a physical downlink control channel (PDCCH) and the uplink transmission is based on a physical uplink control channel (PUCCH).

22. The method of claim 16, further comprising:
   transmitting, to the network node, a second uplink transmission to report a second altitude associated with the UE and a second metric associated with the connection; and
   receiving, from the network node, a second downlink transmission based on a third antenna tilt angle and a third beam width, wherein the third antenna tilt angle and the third beam width based on the second altitude and the second metric.

23. The method of claim 22, wherein transmitting the second uplink transmission to report the second altitude associated with the UE and the second metric associated with the connection further comprises:
   receiving, from the network node, a request to report the second altitude associated with the UE and the second metric associated with the connection; and
   transmitting, to the network node based on the request, the second uplink transmission to report the second altitude associated with the UE and the second metric associated with the connection.

24. A method for wireless communication at a network node, comprising:
   establishing a connection with a user equipment (UE);
   determining a first antenna tilt angle and a first beam width;
   adjusting a beam associated with the connection based on the first antenna tilt angle and the first beam width;

receiving an uplink transmission to report an altitude associated with the UE and a metric associated with the connection; and
transmitting, for the UE, a downlink transmission based on a second antenna tilt angle and a second beam width, wherein the second antenna tilt angle and the second beam width based on the altitude and the metric, and wherein the second antenna tilt angle is based on a weighted average altitude associated with a group of UEs.

25. The method of claim 24, wherein the metric comprises one of a reference signal received quality (RSRQ), a received signal strength indicator (RSSI), a reference signal received power (RSRP), or a signal to interference and noise ratio (SINR).

26. The method of claim 24, wherein receiving the uplink transmission to report the altitude associated with the UE and the metric associated with the connection comprises:
   transmitting, for the UE, a request to report the altitude associated with the UE and the metric associated with the connection; and
   receiving, based on the request, the uplink transmission to report the altitude associated with the UE and the metric associated with the connection.

27. The method of claim 26, wherein transmitting the downlink transmission comprises:
   adjusting the beam associated with the connection based on the second antenna tilt angle and the second beam width.

28. The method of claim 26, wherein the request is based on a physical downlink control channel (PDCCH) and the uplink transmission is based on a physical uplink control channel (PUCCH).

29. The method of claim 24, further comprising:
   receiving a second uplink transmission to report a second altitude associated with the UE and a second metric associated with the connection; and
   transmitting, for the UE, a second downlink transmission based on a third antenna tilt angle and a third beam width, wherein the third antenna tilt angle and the third beam width based on the second altitude and the second metric.

30. The method of claim 29, wherein receiving the second uplink transmission to report the second altitude associated with the UE and the second metric associated with the connection comprises:
   transmitting, for the UE, a request to report the second altitude associated with the UE and the second metric associated with the connection; and
   receiving, based on the request, the second uplink transmission to report the second altitude associated with the UE and the second metric associated with the connection.

* * * * *